United States Patent [19]
Grimsrud et al.

[11] Patent Number: 5,920,896
[45] Date of Patent: *Jul. 6, 1999

[54] REDUCING OPERATING SYSTEM START-UP/BOOT TIME THROUGH DISK BLOCK RELOCATION

[75] Inventors: Knut Grimsrud, Aloha; Rick Coulson, Portland, both of Oreg.

[73] Assignee: Intel Corporation, Santa Clara, Calif.

[ * ] Notice: This patent is subject to a terminal disclaimer.

[21] Appl. No.: 08/822,640

[22] Filed: Mar. 21, 1997

[51] Int. Cl.$^6$ ........................... G06F 12/00
[52] U.S. Cl. .................. 711/165; 711/163; 711/167; 711/156; 711/170; 395/651
[58] Field of Search ...................... 711/113, 170, 711/165, 163; 364/651, 652, 280, 280.2, 236.2, 248.1; 395/681, 651, 750

[56] References Cited

U.S. PATENT DOCUMENTS

| | | | |
|---|---|---|---|
| 5,787,296 | 7/1998 | Grimsrud et al. | 395/750 |
| 5,802,593 | 9/1998 | Grimsrud et al. | 711/163 |

*Primary Examiner*—Eddie P. Chan
*Assistant Examiner*—KiMberly Nicole McLean
*Attorney, Agent, or Firm*—Blakely, Sokoloff, Taylor & Zafman

[57] ABSTRACT

A computer system is equipped with an operating system having a tracer driver for generating trace data including disk locations accessed for disk accesses made by various components of the operating system during system startup/boot time. The tracer driver is loaded at an initial phase of system start-up. The computer system is further equipped with a companion disk block relocation driver for generating, if possible, an alternative disk block allocation for a current disk block allocation that will yield improved overall access time for a sequence of disk accesses. In some embodiments, the disk block relocation driver includes logic for tracing the sequence of disk accesses to determine the current disk block allocation, logic for generating the alternative disk block allocation, if possible, using the trace results, and logic for effectuating the alternate disk block allocation, if generated. In one particular embodiment, the logic for generating the alternative disk block allocation employs a random search approach, while in another embodiment, the logic for generating the alternative disk block allocation employs a heuristic approach.

34 Claims, 11 Drawing Sheets

REDUCING OPERATING SYSTEM START-UP/BOOT TIME THROUGH DISK BLOCK RELOCATION

BACKGROUND OF THE INVENTION

1. Field of the Invention

The present invention relates to the field of computer systems. More specifically, the present invention relates to the start-up/boot time of operating systems of computer systems.

2. Background Information

In the past decade, performance of microprocessor based computer systems have increased dramatically. In particular, the operating speed of microprocessors have increased from the meager 16 MHz to well over 200 MHz. This trend is expected to continue without abatement. Correspondingly, while not as dramatic, performance of system and input/output (I/O) buses have also improved substantially, ensuring the microprocessors have adequate data to work with and kept busy. However, except for the improvement provided by buffering etc., the performance of disk drive has lagged behind. As a result, users are often deprived of the full benefit of the increased performance by the microprocessors. For example, when starting up a computer system, because the large majority of time is often spent on loading the kernel and the essential device drivers of the operating system into memory from a disk drive, a user often does not see any significant difference in performance whether the user is using a system equipped with a 100 MHz microprocessor or a 200 MHz microprocessor. Thus, it is desirable to be able to reduce the start-up/boot time of an operating system. As will be disclosed in more detail below, the present invention provides the desired improvement as well as other desirable results, which will be readily apparent to those skilled in the art, upon reading the detailed description to follow.

SUMMARY OF THE INVENTION

A computer system is equipped with an operating system having a tracer driver for generating trace data including disk locations accessed for disk accesses made by various components of the operating system during start-up/boot time. The trace driver is loaded at an initial phase of system start-up/boot. In one embodiment, the trace driver is configurable to be either enabled or disabled.

The computer system is further equipped with a disk block relocation utility with logic for generating, if possible, an alternative disk block allocation for the disk blocks accessed during system start-up/boot time, that will yield improved overall access time for the disk accesses, thereby improving system start-up/boot time. In some embodiments, the disk block relocation utility includes logic for generating the alternative disk block allocation, if possible, using the trace results, as well as logic for effectuating the alternate disk block allocation, if generated. In one particular embodiment, the logic for generating the alternative disk block allocation employs a random search approach, while in another embodiment, the logic for generating the alternative disk block allocation employs a heuristic approach.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
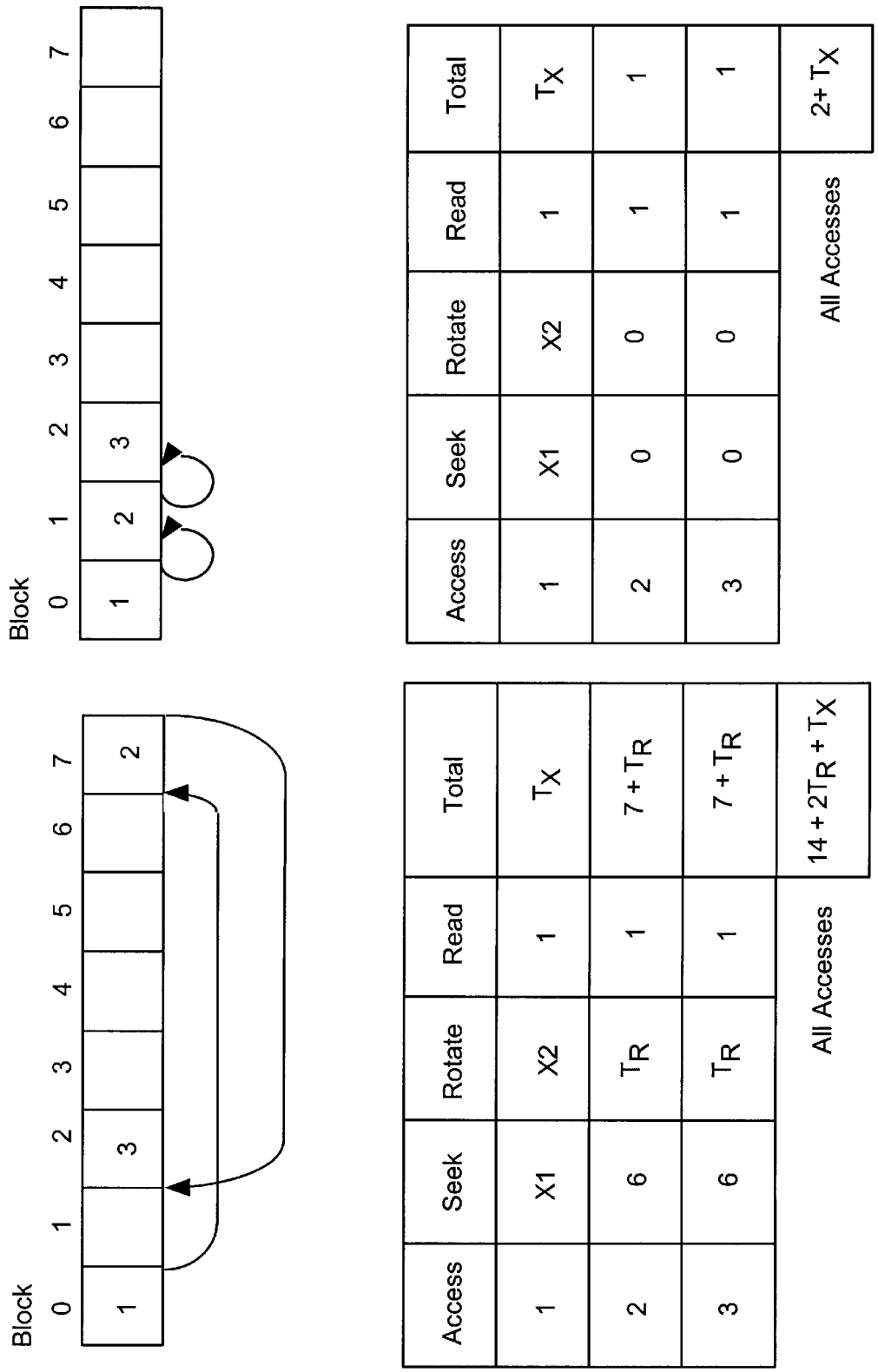
FIG. 1 is a simplified illustration of the present invention.

Referring now to FIG. 1, wherein a simplified illustration of the present invention is shown. Illustrated on the top half of the figure are two simplified block representations 10*a* and 10*b* of a disk drive having eight blocks, block 0 through block 7. Denoted therein inside the blocks accessed by the three accesses of a simple sequence of disk accesses are the access identifiers, access 1, access 2 and access 3. The access pattern denoted in simplified block representation 10a illustrates the manner in which the three accesses are made, under an hypothetical disk block allocation, without optimization in accordance with the present invention, whereas the access pattern denoted in simplified block representation 10b illustrates the manner in which the same three accesses are made, under an alternate optimized disk block reallocation, wherein the data previously stored in block 7 have been moved to block 1, in accordance with the present invention.

Illustrated in the bottom half of the figure are illustrative estimates of the access times (in milli-seconds) for the three accesses under the unoptimized and optimized disk block allocations. As shown, and readily appreciated by those skilled in the art, the read times are substantially the same for all accesses under either allocation, however, under the optimized disk block allocation, significant amount of time savings will be achieved for seek and rotation times, as the block displacement between the successive accesses are much smaller, as compared to the unoptimized disk block allocation. In other words, by reallocating disk blocks, if it can be done, significant performance improvement can be achieved for a sequence of disk accesses.

As will be readily appreciated by those skilled in the art, the above simplified illustration is merely provided for ease of understanding. The problem addressed by the present invention is many times more complex than the simplified illustration. The lengths of the access sequences that are of interest are typically significantly longer. Additionally, many blocks are accessed multiple times in one sequence, and the multiple accesses are not necessarily in the same order. In other words, block x may be accessed n times in a sequence of interest, the first time after accessing block y, the second time after accessing block z, and so forth. Furthermore, not all blocks are available for re-allocation. Thus, the optimized disk block reallocation is seldom as simple as reallocating the disk blocks into a group of contiguous disk blocks, as illustrated by block representation 10b.

Figure 2:
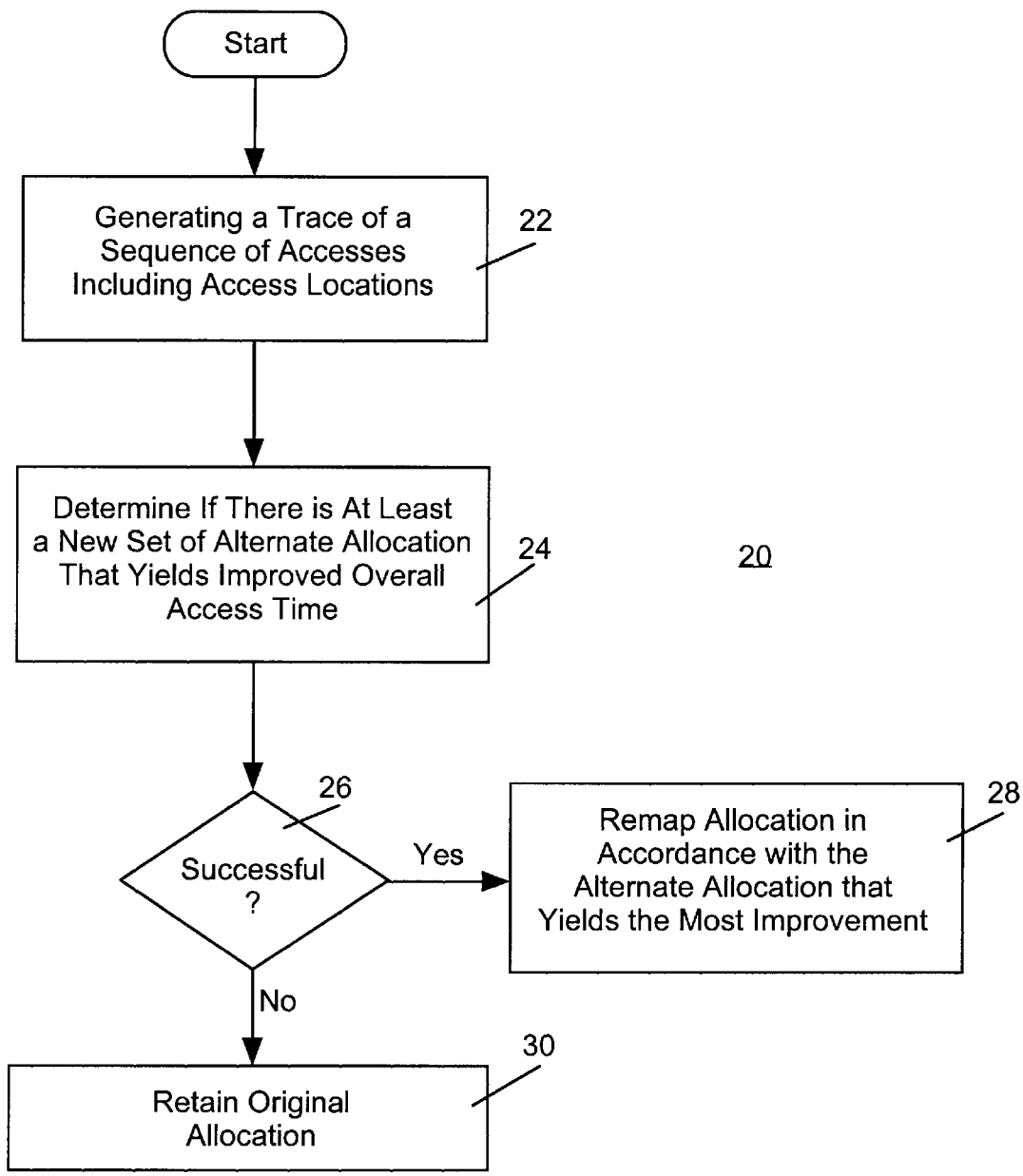
FIG. 2 illustrates one embodiment of the method steps of the present invention.

FIG. 2 illustrates one embodiment of the method steps of the present invention. As shown, for the illustrated embodiment, a trace is first generated for a sequence of disk accesses that are of interest, step 22. The trace includes information such as the disk locations accessed. Next, one or more attempts are made to generate an alternate disk block allocation that will yield improved overall access time, as determined by a cost function, step 24. An example of a simple cost function, for illustrative purpose, is $T = d \times c1 + c2 + c3$, where T=access time, d is seek distance, c1 is seek time per unit of seek distance, c2 is rotation time, and c3 is read time. If at least one of the attempts is successful, the data are remapped into the alternate disk block allocation that yields the most improvement in overall access time, step 28. Otherwise, the original disk block allocation is retained, step 30.

Figure 3:
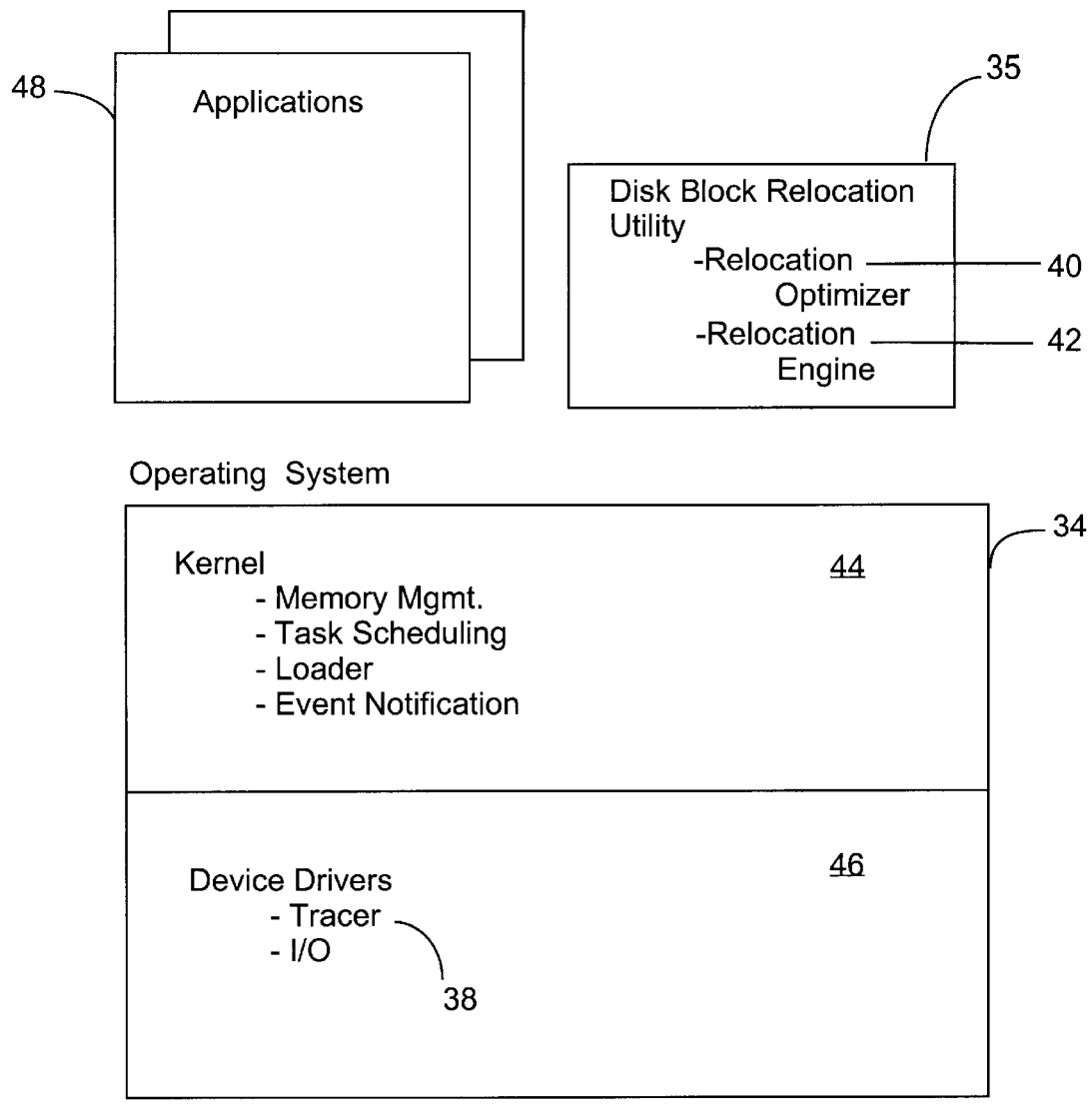
FIG. 3 illustrates one embodiment of the present invention.

FIG. 3 illustrates one embodiment of the present invention. As shown, for the illustrated embodiment, the present invention includes tracer driver 38 integrated with operating system 34, and companion disk block relocation utility 35. As will be described in more detail below, integrated tracer driver 38 is used for generating trace data including disk block locations for disk accesses made by various components of operating system 34 during system start-up/boot time, and companion disk relocation utility 35 is used to generate an alternate disk block allocation, if possible, for the disk location accessed, to improved the overall disk access time, thereby reducing the operating system start-up/boot time.

For the illustrated embodiment, operating system 34 includes kernel 44 for providing core functions such as memory management, task scheduling, module loading, and event notifications. Additionally, operating system 34 further includes a number of device drivers 46, including in particular, device drivers for providing I/O read/write services for accessing disk drives, tracer driver 38 for tracing disk accesses made by the various components of operating system 34 during system start-up/boot time.

For the illustrated embodiment, module loading service includes a feature for pre-specifying the order for loading the various components of operating system 34. In accordance with the present invention, the device driver for performing disk accesses, the service for providing event notifications, and tracer driver 38 are specified as "early load" device drivers/functions, that is, these services/device drivers are to be loaded at the initial phase of the start-up/boot process. Precisely, how early can these device drivers/services can be loaded is operating system dependent. Preferably, they are loaded as early as possible, as the earlier these device drivers/services are loaded, the larger the amount of disk accesses made during system start-up/boot will be traced by tracer driver 38.

For the illustrated embodiment, tracer driver 38 leverages on the event notification services of kernel 44 to trace the disk accesses made. Tracer driver 38 logs the trace results in a temporary buffer in memory (not shown). In one embodiment, tracer driver 38 is configurable to be either enabled or disabled from performing the tracing during the start-up/boot process.

Companion disk block relocation utility 35 includes reallocation optimizer 40 and reallocation engine 42. Reallocation optimizer 40 is used to generate, if possible, an alternate disk block allocation that will yield improved overall access time for the sequence of operating system disk accesses, using the trace results logged into the temporary buffer. In one embodiment, upon invocation, reallocation optimizer 40 copies the trace results from the temporary buffer into a local work area, prior to analyzing the trace results. If successful, for the illustrated embodiment, reallocation optimizer 40 generates a reallocation vector (not shown) setting forth the manner in which the disk blocks should be reallocated. Reallocation engine 42 is used to effectuate the reallocation as stipulated by the reallocation vector.

In other words, the above described operations of tracing, generation of alternate disk block allocation, and effectuating the reallocation, subject to the authorization of the user, may be performed periodically. Once performed, the user will experience faster operating system start-up/boot time, as a result of reduction in disk access time. If the start-up/boot time deteriorates over a period of usage, through e.g. code update or new device drivers being installed, and the new code being stored in unoptimized disk locations, the user may authorize the tracing and reallocation to be performed again, to regain the desired improved start-up/boot time.

Figure 4:
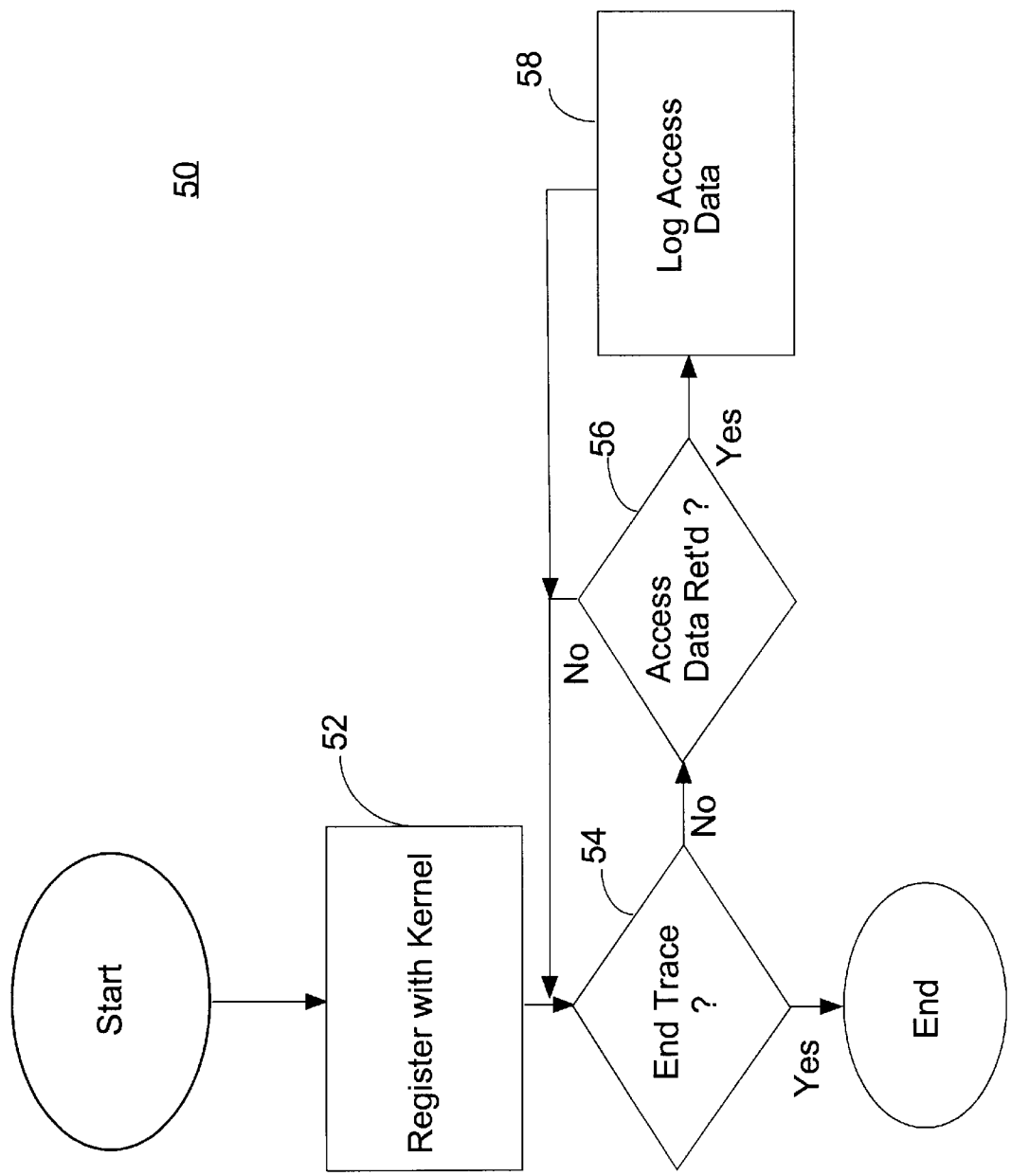
FIG. 4 illustrates one embodiment of the operation flow of the tracer.

FIG. 4 illustrates one embodiment of tracer 38. As shown, for the illustrated embodiment, upon invocation, tracer driver 38 registers itself with kernel 44 (after the event notification service of kernel 44 has been loaded and operational), denoting its interest in disk accesses made by the various components of operating system 34, step 52. Upon registering itself, tracer driver 38 waits for the requested information to be returned from kernel 44, and logs the access data as they are returned, as long as the trace period has not elapsed, steps 54–58. Tracer driver 38 may be encoded or dynamically provided with the length of the trace period, e.g. the entire start-up/boot period, or a portion thereof. In one embodiment, tracer driver 38 considers the trace period elapsed, when relocation optimizer 40 retrieves the logged access data from its temporary buffer.

Figures 5, 6:
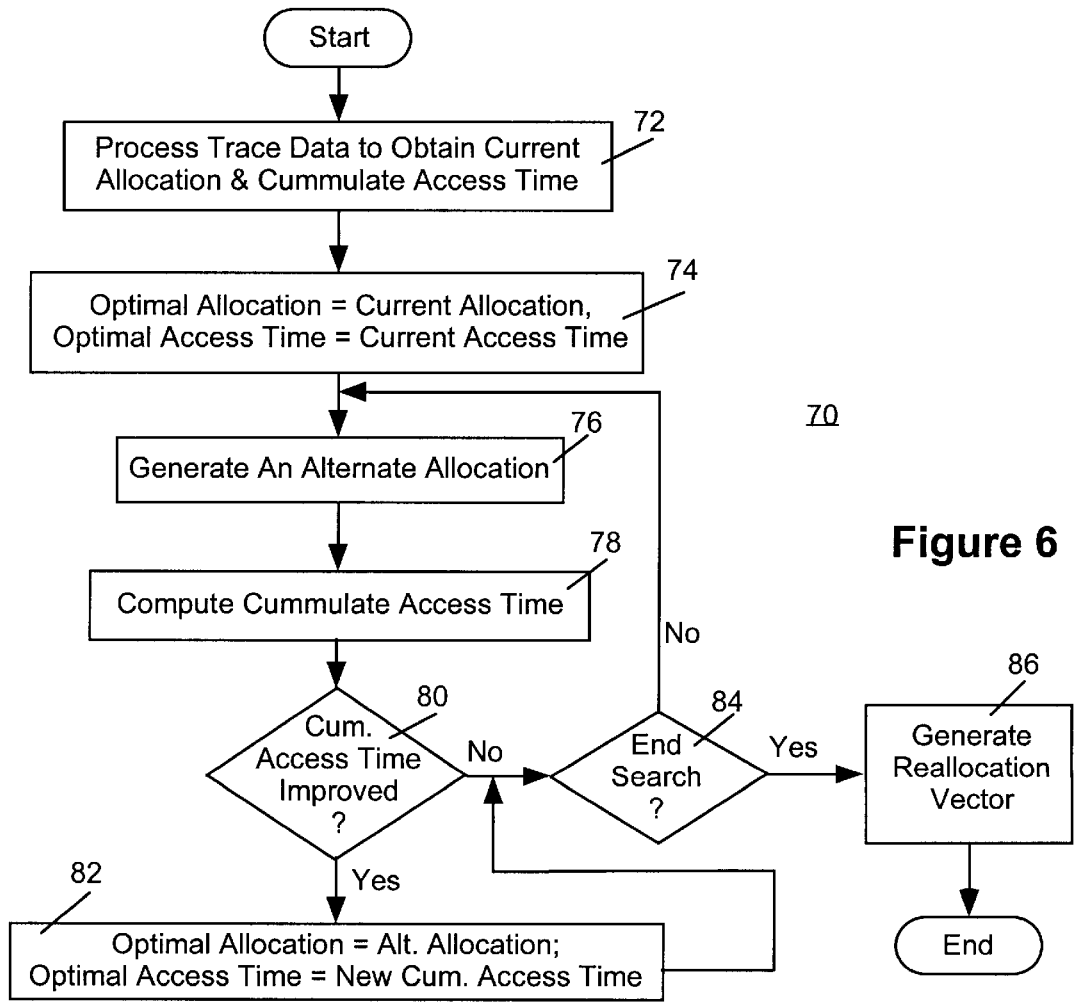
FIG. 5 illustrates one embodiment of the trace log.
FIG. 6 illustrates one embodiment of the operation flow of the reallocation optimizer.

FIG. 5 illustrates one embodiment of the logged trace data. As shown, for the illustrated embodiment, the logged trace data includes a number of access records 62. Each access record 62 includes an access identifier 64 identifying the access sequence number, and the disk blocks accessed 66.

FIG. 6 illustrates one embodiment of reallocation optimizer 40. As shown, for the illustrated embodiment, upon invocation, reallocation optimizer 40 processes the trace data recorded to obtain the current disk block allocation for the sequence of disk accesses of interest, i.e. the disk locations accessed, and in turn generates the cumulative access time for the current disk block allocation, step 72. Next, reallocation optimizer 40 notes that current disk block allocation as the optimal disk block allocation, and the current cumulative access time as the optimal cumulative access time, step 74.

Having done so, reallocation optimizer 40 generates an alternate disk block allocation with randomized incremental changes, step 76. Randomized incremental changes may be synthesized in accordance with any number of such techniques known in the art. Using the generated alternate disk block allocation, reallocation optimizer 40 determine a new cumulative access time for the sequence of disk accesses of interest, step 78. If the generated alternate disk block allocation yields improved overall access time, i.e. the new cumulative access time is better than the "optimal" cumulative access time, reallocation optimizer 40 notes the generated alternate disk block allocation as the optimal disk block allocation, and the new cumulative access time as the optimal cumulative access time, step 82. Otherwise, step 82 is skipped.

Steps 76–80 and conditionally step 82 are repeated until a predetermined condition for terminating the search for alternate disk block allocation that yields improved overall access time has been met. A variety of termination conditions may be employed. For example, reallocation optimizer 40 may be encoded or dynamically provided with a parameter delimiting the "length" of search, in terms of total evaluation or elapsed time, number of alternate reallocation schemes evaluated, etc. At the conclusion of the search, reallocation optimizer 40 generates the reallocation vector denoting the reallocation to be performed, based on the optimal disk block allocation, step 86. For the illustrated embodiment, if the optimal disk block allocation was never updated, i.e. no disk block allocation yielding improved overall access time was found, the reallocation vector is a null vector.

Figure 7:
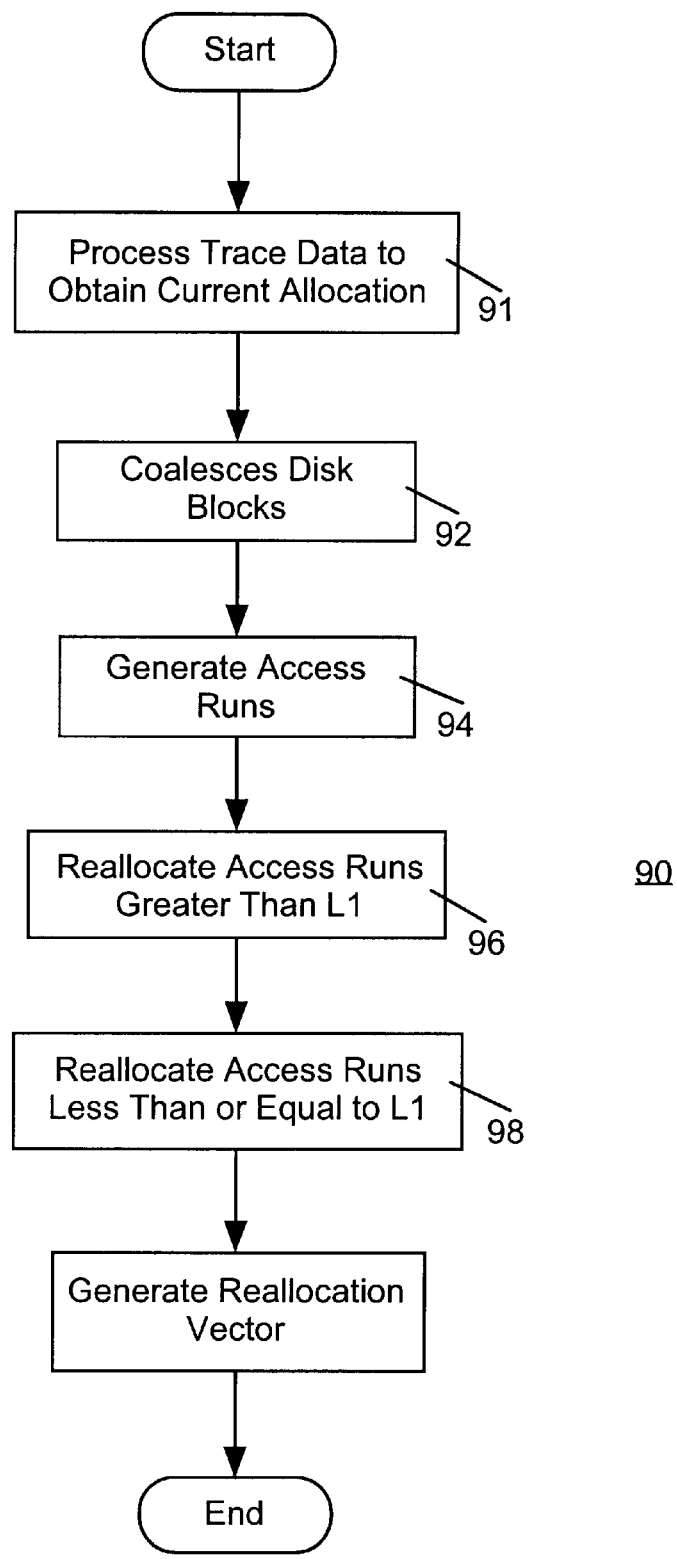
FIG. 7 illustrates an alternative embodiment of the operation flow of the reallocation optimizer.

FIG. 7 illustrates an alternate embodiment of reallocation optimizer 40. As shown, for the illustrated embodiment, upon invocation, similar to the earlier described embodiment, reallocation optimizer 40 processes the trace data recorded to obtain the current disk block allocation for the sequence of disk accesses of interest, i.e. the disk locations accessed, and in turn computes the cumulative access time for the current disk block allocation, step 91. Next, unlike the earlier described embodiment, reallocation optimizer 40 coalesces the disk blocks, step 92. Coalescing the disk blocks may be performed in any one of a number of known techniques. One approach will be briefly described later.

Figure 8:
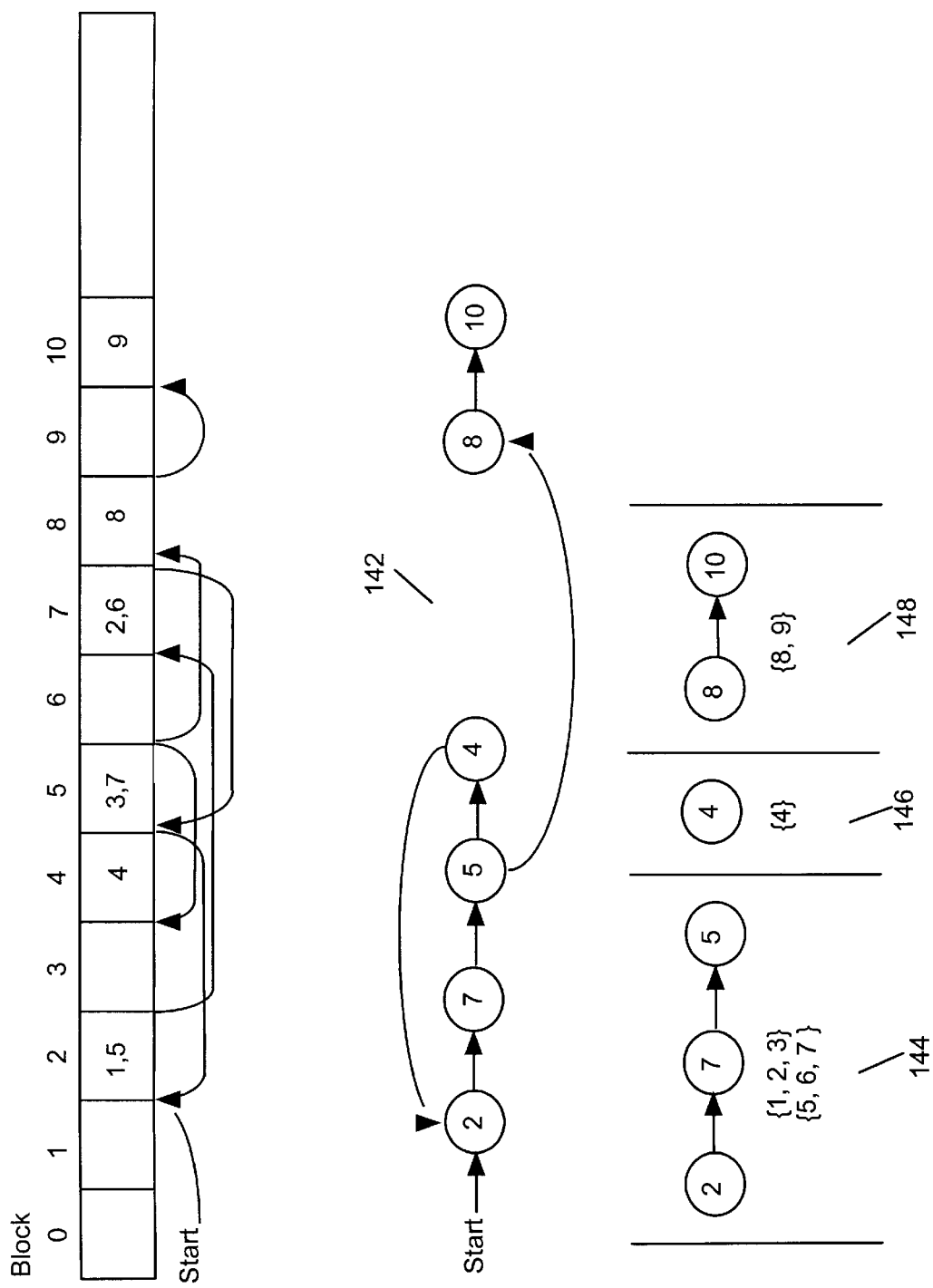
FIG. 8 illustrates in further details the concept of access run.

Having coalesced the disk blocks, reallocation optimizer 40 proceeds to analyze the trace data and groups the disk accesses into access runs, step 94. FIG. 8 illustrates the concept of access runs. Illustrated therein is a hypothetical sequence of disk accesses, access 1 through access 9, against the enumerated blocks in the order shown. For this hypothetical sequence of disk accesses, blocks 2, 7 and 5 are always accessed as a "run". These blocks are accessed in order during access 1 through access 3, and then during access 5 through access 7. Likewise, blocks 8 and 10 are also considered as a "run", except it is accessed only once. Block 4 is a "run" with a run length of one.

Return now to FIG. 7, having grouped the accesses into access runs, reallocation optimizer 40 reallocates the disk block on an access run basis. For the illustrated embodiment, the "longer" access runs are reallocated first, step 96, before the "shorter" access runs are reallocated, step 98. "Longer" access runs are access runs with run lengths greater than a predetermined run length threshold (L1), whereas "shorter" access runs are access runs with run length shorter than L1. The value of L1 is application dependent, and is empirically determined. In one embodiment, L1 is set to 64. After, both the "longer" as well as the "shorter" access runs have been reallocated, reallocation optimizer 40 generates the reallocation vector as the earlier described embodiment.

Figure 9:
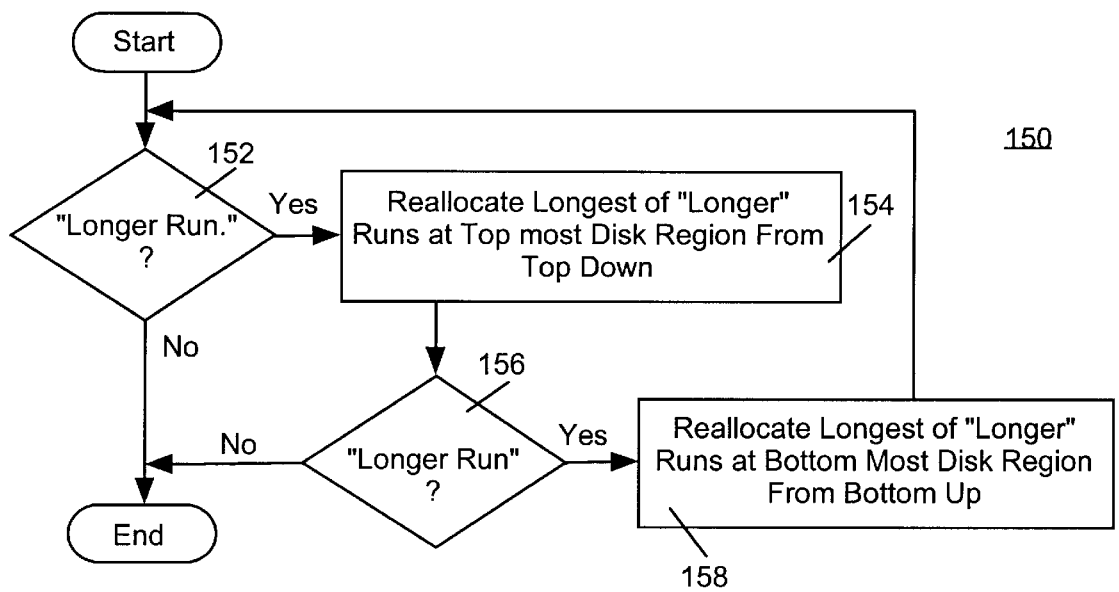
FIG. 9 illustrates in further details one embodiment of the "long access run" reallocation step.
Figure 10:
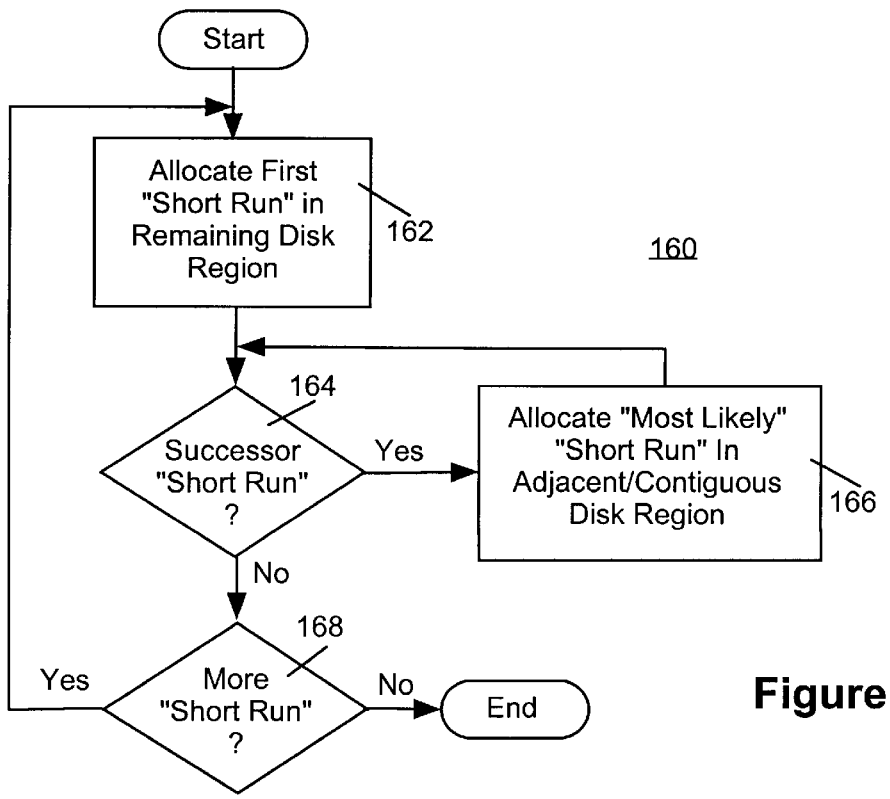
FIG. 10 illustrates in further details one embodiment of the "short access run" reallocation step.
Figure 11:
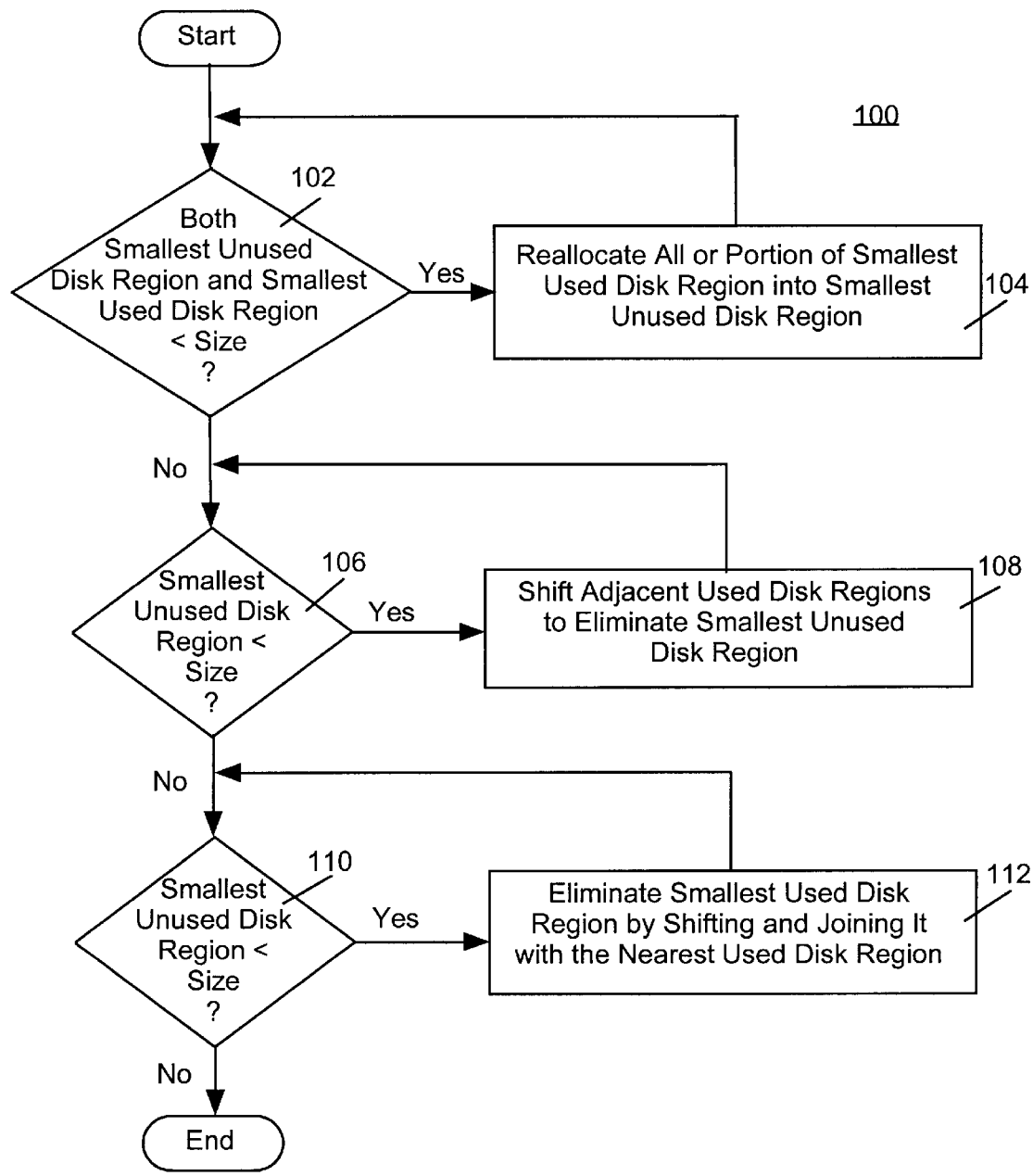
FIGS. 11–14 illustrate in further details one embodiment of the coalescing step.

FIGS. 9–10 illustrate one embodiment each for reallocating the "longer" and "shorter" access runs. As shown in FIG. 9, for the illustrated embodiment, reallocation optimizer 40 reallocates the "longer" access runs to contiguous disk regions at both ends of a disk, alternating between the two ends, until all "longer" access runs have been reallocated. At step 152, reallocation optimizer 40 determines if there are still "longer" access runs to be reallocated. If the determination is affirmative, for the illustrated embodiment, reallocation optimizer 40 reallocates the longest of the remaining "longer" run to the "top most" portion of the disk region, step 154. At step 156, reallocation optimizer 40 again determines if there are still "longer" access runs to be reallocated. If the determination is affirmative, for the illustrated embodiment, reallocation optimizer 40 reallocates the longest of the remaining "longer" run to the "bottom most" portion of the disk region, step 158. Steps 152–158 are repeated until all "longer" access runs have been reallocated. As steps 154 and 158 are repeated, the "top most" portion bound reallocations are reallocated in a "top down" manner, whereas the "bottom most" portion bound reallocation are reallocated in a "bottom up" manner. In other words, the "center" portion of the disk region is left unallocated at the end of the "longer" access run reallocation.

As shown in FIG. 10, for the illustrated embodiment, reallocation optimizer 40 reallocates the "shorter" access runs, by first arbitrarily picking one of the "shorter" access runs, step 162. Then the successor "shorter" access runs to the selected "shorter" access run are reallocated near the selected "shorter" access run based on their likelihood of occurrence, i.e. the frequency of occurrence of the successor "shorter" access run, steps 164–166. A successor access run is simply an access run that follows the selected access run. Steps 164–166 are then repeated until all successor access runs to the selected access run are reallocated. Then, the entire "shorter" access run reallocation process, i.e. steps 162–166 are repeated until all "shorter" access runs have been reallocated.

The two approaches to reallocating "longer" and "shorter" access runs are complementary to each other. Together the two approaches provide the advantage of reducing the access time of the "shorter" access runs, since they are all concentrated at the "center" portion of the disk region, and the advantage of spreading the higher cost of moving to the end portions of the disk region over a larger number of accesses, since a number of successive accesses will be made at the end portions once the actuator is moved there.

Figure 12:
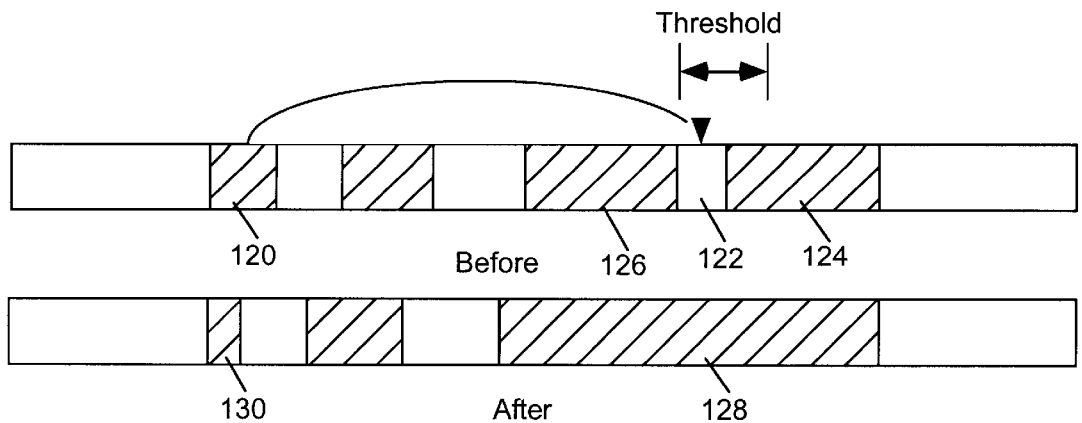

Returning now to the topic of coalescing disk blocks of a disk drive. FIGS. 11–14 illustrate one approach for achieving the desired coalescing of disk blocks. As shown, for the illustrated approach, reallocation optimizer 40 first determines if both the smallest unused disk region[1] as well as the smallest used region are smaller than a predetermined size, step 102. The value of the predetermined size is also application dependent, and empirically determined. In one embodiment, a value of 64 is also used for the predetermined size. If the determination is affirmative, reallocation optimizer 40 reallocates all or a portion of the smallest used disk region into the smallest unused disk region, step 104 (see also FIG. 12). Steps 102–104 are repeated until either the smallest unused disk region or the smallest used disk region is greater than or equal to the predetermined size. Together, these two steps have the effect of filling up the small "in-between" unused disk regions, and eliminate the small "in-between" used disk regions, as illustrated by FIG. 12.

[1] For the purpose of this application, an unused disk region is a disk region not accessed during the trace, the disk region may or may not have been allocated.

Figure 13:
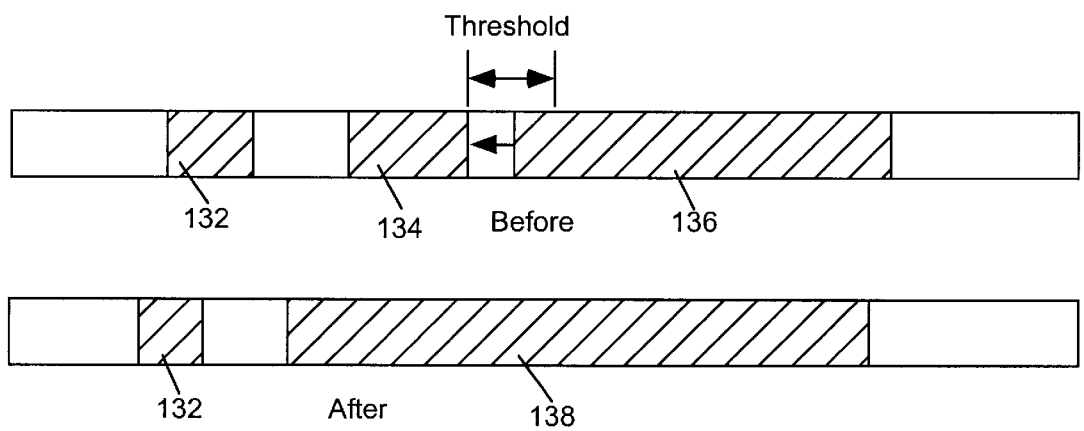

Next, for the illustrated approach, reallocation optimizer 40 determines if the smallest unused disk region is smaller than the predetermined size, step 106. If the determination is affirmative, reallocation optimizer 40 reallocates one or both of the two used disk regions bounding the smallest unused disk region, by shifting one towards the other, or both towards each other, step 108 (see also FIG. 13). Steps 106–108 are repeated until the smallest unused disk region is greater than or equal to the predetermined size. Together, these two steps have the effect of eliminating the "in-between" small unused disk regions as illustrated by FIG. 13.

Figure 14:
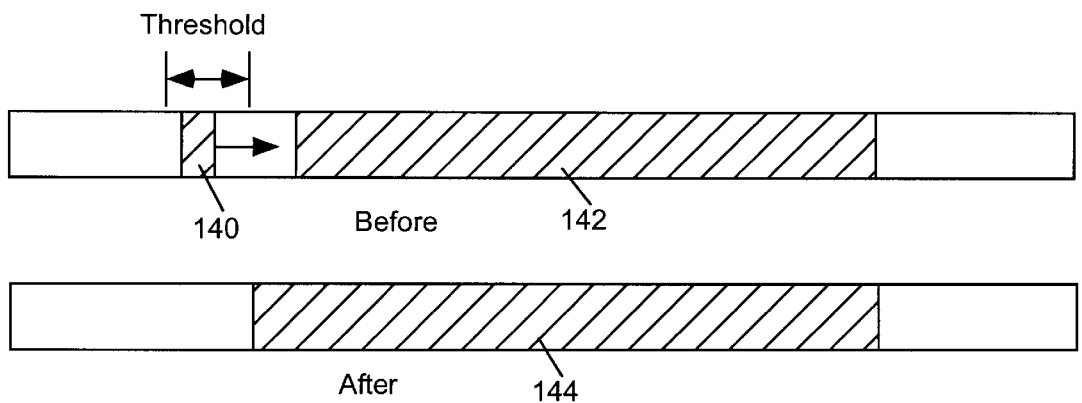

Next, for the illustrated approach, reallocation optimizer 40 determines if the smallest used disk region is smaller than the predetermined size, step 110. If the determination is affirmative, reallocation optimizer 40 reallocates the smallest used disk region, by shifting it towards the closest neighboring used disk region, step 112 (see also FIG. 14). Steps 110–112 are repeated until the smallest used disk region is greater than or equal to the predetermined size. Together, these two steps have the effect of eliminating any "in-between" used disk regions as illustrated by FIG. 14.

While at first brush, the two embodiments for generating an alternate disk block allocation that yields improved overall access time appear to be very different, as will be appreciated by those skilled in the art, they are really two species of a genus of approaches to practically and optimally solving the cost function of overall access time, expressed in terms of disk block allocation, i.e. Min. $C\{b1, b2, \ldots, bn\}$, where $C\{\ \}$ is the cost function of overall access time, and (b1, b2, ... bn) is a set of disk block allocation.

Figure 15:
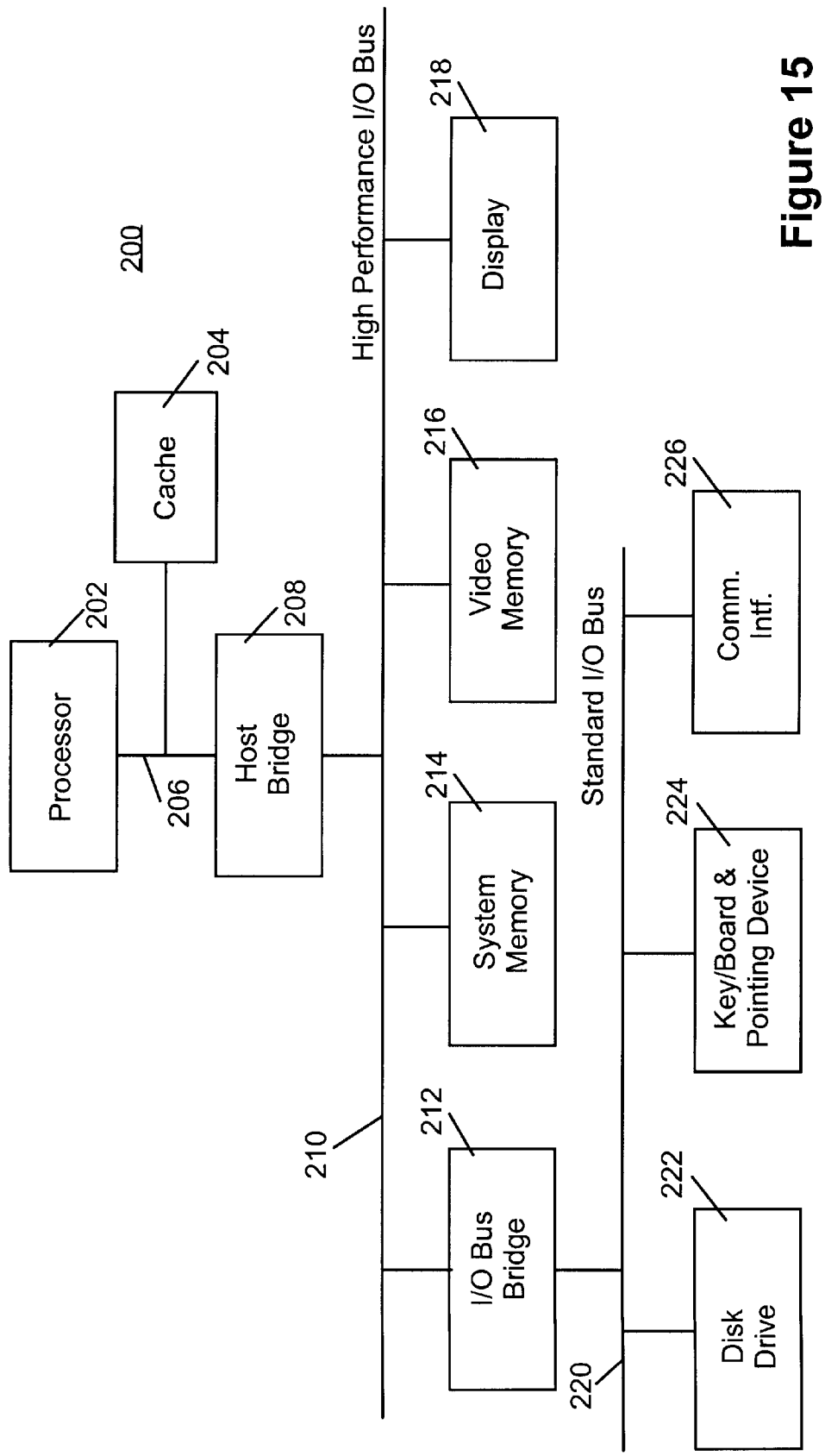
FIG. 15 illustrates one embodiment of a computer system suitable for programming with the embodiment of the present invention illustrated in FIG. 3.

FIG. 15 illustrates one embodiment of a computer system suitable for equipping with the operating system of the present invention described above. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus 206 is cache 204. Coupled to high performance I/O bus 210 are system memory 214 and video memory 216, against which video display 218 is coupled. Coupled to standard I/O bus 220 are disk drive 222, keyboard and pointing device 224 and communication interface 226.

These elements perform their conventional functions known in the art. In particular, disk drive 222 and system memory 214 are used to store a permanent and a working copy of the programming instructions of operating system 34, including tracer driver 38, and companion disk block relocation utility 35 for effectuating the teachings of the present invention, when executed by processor 202. The permanent copy may be pre-loaded into disk drive 222 in factory, loaded from distribution medium 228, or down loaded from on-line/networked distribution source 230. The constitutions of these elements are known. Any one of a number of implementations of these elements known in the art may be used to form computer system 200.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a method and an apparatus for reducing operating system startup/boot time have been described.

What is claimed is:

1. An apparatus comprising
   (a) an execution unit for executing programming instructions; and
   (b) a storage medium coupled to the execution unit and having stored therein a first plurality of programming instructions to be executed by the execution unit during system start-up for implementing a plurality of operating system functions, including a tracer function to be loaded at an initial loading phase during system start-up for generating trace data including disk locations accessed and the order the disk locations are accessed for a sequence of disk accesses made to subsequently load one or more of the other operating system functions during said system start-up, and
   a second plurality of programming instructions to be executed by the execution unit after said system start-up for implementing a disk block relocation utility for analyzing the trace data generated during said system start-up, and generating a new set of disk locations to reallocate the accessed disk locations such that overall access time will be improved, the new set of disk locations being generated in accordance with at least the order the disk locations are accessed.

2. The apparatus as set forth in claim 1, wherein the tracer function logs the access data into a buffer until the disk block relocation utility retrieves the logged data.

3. The apparatus as set forth in claim 1, wherein the disk block relocation utility includes logic for generating a remapping vector mapping the disk locations accessed to the new set of disk locations.

4. The apparatus as set forth in claim 3, wherein the disk block relocation utility includes logic for relocating the disk locations accessed to the new set of disk locations using the remapping vector.

5. The apparatus as set forth in claim 1, wherein the disk block relocation utility includes logic for optimizing a cost function of overall access time which is functionally dependent on disk locations accessed, to generate the new set of disk locations.

6. The apparatus as set forth in claim 5, wherein the disk block relocation utility includes logic for generating a new set of disk locations, and determining if the generated new set of disk locations yields improvement in overall access time.

7. The apparatus as set forth in claim 6, wherein the disk block relocation utility includes logic for repeating the generation of an arbitrary set of disk locations, and the determination of whether the generated arbitrary set of disk locations yields improvement on overall access time.

8. The apparatus as set forth in claim 5, wherein the disk block relocation utility includes logic for coalescing disk blocks of a disk drive.

9. The apparatus as set forth in claim 5, wherein the disk block relocation utility includes logic for grouping the disk accesses into access runs.

10. The apparatus as set forth in claim 9, wherein the disk block relocation utility includes logic for generating new disk locations for the disk locations accessed by the various access runs.

11. The apparatus as set forth in claim 10, wherein the disk block relocation utility includes logic for generating new disk locations from top most portions of a disk region in a top down manner for access runs having run lengths of a particular type.

12. The apparatus as set forth in claim 10, wherein the disk block relocation utility includes logic for generating new disk locations from bottom most portions of a disk region in a bottom up manner for access runs having run lengths of a particular type.

13. The apparatus as set forth in claim 10, wherein the disk block relocation utility includes logic for alternatingly generating new disk locations from top most portions of a disk region in a top down manner and from bottom most portions of the disk region in a bottom up manner for access runs having run length of a particular type.

14. The apparatus as set forth in claim 10, wherein the disk block relocation utility includes logic for generating new disk locations from center portions of a disk region for access runs having run lengths of a particular type.

15. The apparatus as set forth in claim 14, wherein the disk block relocation utility for generating new disk locations from center portions of a disk region for access runs having run lengths of a particular type, generates the new disk locations factoring into consideration likelihood of occurrence of interrelated access runs of the same type.

16. A machine implemented method comprising the steps of:
   a) loading a tracer function incorporated as an integral part of an operating system at an initial phase during system start-up, and using the loaded tracer function to trace a sequence of disk accesses made to subsequently load one or more other operating system functions during said system start-up, and generating trace data for the disk accesses traced including disk locations accessed and the order the disk locations are accessed;
   b) generating after said system start-up a new set of disk locations that yield improvement on overall access time, over the disk locations accessed, the new set of disk locations being generated in accordance with at least on the order the disk locations are accessed.

17. The method as set forth in claim 16, wherein the method further includes the step of (c) generating a remapping vector mapping the disk locations accessed to the new set of disk locations, if step (b) was successful in generating the new set of disk locations.

18. The machine implemented method as set forth in claim 17, wherein the method further includes the step (d) relocating the disk locations accessed to the new set of disk locations using the remapping vector, if step (c) was performed.

19. The machine implemented method as set forth in claim 16, wherein step (b) includes optimizing a cost function of overall access time which is functionally dependent on disk locations accessed.

20. The machine implemented method as set forth in claim 19, wherein the cost function optimization of step (b) includes generating a new set of disk locations, and determining if the generated arbitrary set of disk locations yields improvement on overall access time.

21. The machine implemented method as set forth in claim 20, wherein the cost function optimization of step (b) further includes repeating the generation of an arbitrary set of disk locations, and the determination of whether the generated arbitrary set of disk locations yields improvement on overall access time.

22. The machine implemented method as set forth in claim 19, wherein step (b) further includes coalescing disk blocks of a disk drive.

23. The machine implemented method as set forth in claim 19, wherein step (b) further includes grouping the disk accesses into access runs.

24. The machine implemented method as set forth in claim 23, wherein the generation of new disk locations for the disk locations accessed of step (b) is performed by generating new disk locations for the various access runs.

25. The machine implemented method as set forth in claim 24, wherein the generation of new disk locations of step (b) includes generating new disk locations from top most portions of a disk region in a top down manner for access runs having run lengths of a particular type.

26. The machine implemented method as set forth in claim 24, wherein the generation of new disk locations of step (b) includes generating new disk locations from bottom most portions of a disk region in a bottom up manner for access runs having run lengths of a particular type.

27. The machine implemented method as set forth in claim 24, wherein the generation of new disk locations of step (b) includes alternatingly generating new disk locations from top most portions of a disk region in a top down manner and from bottom most portions of the disk region in a bottom up manner for access runs having run length of a particular type.

28. The machine implemented method as set forth in claim 24, wherein the generation of new disk locations of step (b) includes generating new disk locations from center portions of a disk region for access runs having run lengths of a particular type.

29. The machine implemented method as set forth in claim 28, wherein the generation of new disk locations from center portions of a disk region for access runs having run lengths of a particular type, includes factoring into consideration likelihood of occurrence of interrelated access runs of the same type.

30. A storage medium having stored therein a first plurality of programming instructions to be executed by an execution unit during a system start-up for implementing a plurality of operating system functions, including a tracer function to be loaded at an initial phase of said system start-up for generating trace data including disk locations accessed and the order the disk locations are accessed for a sequence of disk accesses made to subsequently load one or more of other operating system functions during said system start-up, and a second plurality of programming instructions, to be executed by an execution unit after said system start-up, for implementing a disk block relocation utility for analyzing the generated trace data, and generating a new set of disk locations to reallocate the accessed disk locations such that overall access time will be improved, the new set of disk locations being generated in accordance with at least the order the disk locations are accessed.

31. The storage medium as set forth in claim 30, wherein the disk block relocation utility includes logic for optimizing a cost function of overall access time, which is functionally dependent on disk locations accessed, to generate the new set of disk locations.

32. The storage medium as set forth in claim 31, wherein the disk block relocation utility includes logic for generating a new set of disk locations, and determining if the generated new set of disk locations yields improvement in overall access time.

33. The storage medium as set forth in claim 32, wherein the disk block relocation utility includes logic for repeating the generation of an arbitrary set of disk locations, and the determination of whether the generated arbitrary set of disk locations yields improvement in overall access time.

34. The storage medium as set forth in claim 31, wherein the disk block relocation utility includes logic for coalescing disk blocks of a disk drive.

\* \* \* \* \*